(12) United States Patent
Shimizu

(10) Patent No.: US 11,181,612 B2
(45) Date of Patent: Nov. 23, 2021

(54) INTERFERENCE PREVENTION APPARATUS

(71) Applicant: DENSO CORPORATION, Kariya (JP)

(72) Inventor: Naotsugu Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 85 days.

(21) Appl. No.: 16/524,518

(22) Filed: Jul. 29, 2019

(65) Prior Publication Data

US 2019/0346534 A1 Nov. 14, 2019

Related U.S. Application Data

(63) Continuation of application No. PCT/JP2018/000706, filed on Jan. 12, 2018.

(30) Foreign Application Priority Data

Feb. 2, 2017 (JP) .............................. JP2017-017450

(51) Int. Cl.
*G01S 7/02* (2006.01)
*G01S 7/40* (2006.01)
*G01S 13/28* (2006.01)

(52) U.S. Cl.
CPC ............. *G01S 7/023* (2013.01); *G01S 7/4004* (2013.01); *G01S 7/4056* (2013.01); *G01S 13/282* (2013.01)

(58) Field of Classification Search
CPC ...... G01S 7/023; G01S 7/4004; G01S 7/4056; G01S 13/282
See application file for complete search history.

(56) References Cited

U.S. PATENT DOCUMENTS

| 8,866,668 | B2 * | 10/2014 | Kitagawa | .............. | G01S 13/931 |
| | | | | | 342/173 |
| 9,110,152 | B2 * | 8/2015 | Ando | ................... | G01S 13/931 |
| 2008/0231496 | A1 | 9/2008 | Sakamoto | | |
| 2009/0096661 | A1 | 4/2009 | Sakamoto | | |

FOREIGN PATENT DOCUMENTS

| JP | 2008-232832 A | 10/2008 |
| JP | 2008-232833 A | 10/2008 |

* cited by examiner

*Primary Examiner* — Matthew M Barker
(74) *Attorney, Agent, or Firm* — Maschoff Brennan

(57) ABSTRACT

A prevention section generates a prevention signal by performing an interference removal process of preventing an influence of radio wave interference with respect to a non-prevention signal acquired by an acquisition section from a radar sensor for each processing cycle. An analysis section performs a frequency analysis process by using the prevention signal when an operation mode is an interference mode and by using the non-prevention signal when the operation mode is a normal mode. A determination section determines, based on an analysis result obtained by the analysis section, whether radio wave interference is present. When the operation mode is the normal mode and the interference is determined to be present, a switching section switches the operation mode to the interference mode, maintains the interference mode during a certain number of processing cycles, and then switches the operation mode to the normal mode.

5 Claims, 5 Drawing Sheets

[TIME WAVEFORM]

FFT PROCESS

[FFT WAVEFORM]

INTERFERENCE PREVENTION APPARATUS

CROSS-REFERENCE TO RELATED APPLICATION

The present international application claims the benefit of priority from Japanese Patent Application No. 2017-017450 filed with the Japan Patent Office on Feb. 2, 2017, the description of which is incorporated herein by reference.

BACKGROUND

Technical Field

The present disclosure relates to a technique for preventing influence of radar interference.

Related Art

In some cases, a radar system that is mounted in a vehicle and detects targets, such as other vehicles and stationary objects, which are present around the vehicle, is subjected to radio wave interference with a radar system mounted in the other vehicles or the like. When radio wave interference occurs in a radar system, such as an FMCW radar or a multifrequency CW radar, which extracts various types of information by using a frequency analysis waveform (hereinafter referred to as an FFT waveform) of a beat signal, a noise floor of the FFT waveform is increased. This causes a peak based on a reflected wave from a target to be buried in the noise floor, and thus the target becomes difficult to detect.

SUMMARY

As an aspect of the present disclosure, an interference prevention apparatus is provided which includes: an acquisition section configured to acquire a signal from a radar sensor for each processing cycle which is a preset cycle; a prevention section configured to generate a prevention signal by performing an interference removal process with respect to a non-prevention signal which is the signal acquired by the acquisition section, the interference removal process being a process of preventing an influence of radio wave interference; an analysis section configured to perform a frequency analysis process by using the prevention signal when a set operation mode is an interference mode and by using the non-prevention signal when the operation mode is a normal mode; a determination section configured to determine, based on an analysis result obtained by the analysis section, whether radio wave interference is present; and a switching section configured to, when the operation mode is the normal mode and the determination section determines that the interference is present, switch the operation mode to the interference mode, maintain a state in which the operation mode is the interference mode during a preset number of processing cycles, and then switch the operation mode to the normal mode.

BRIEF DESCRIPTION OF THE DRAWINGS

In the accompanying drawings.

DETAILED DESCRIPTION OF THE PREFERRED EMBODIMENTS

In some cases, a radar system that is mounted in a vehicle and detects targets, such as other vehicles and stationary objects, which are present around the vehicle, is subjected to radio wave interference with a radar system mounted in the other vehicles or the like. When radio wave interference occurs in a radar system, such as an FMCW radar or a multifrequency CW radar, which extracts various types of information by using a frequency analysis waveform (hereinafter referred to as an FFT waveform) of a beat signal, a noise floor of the FFT waveform is increased. This causes a peak based on a reflected wave from a target to be buried in the noise floor, and thus the target becomes difficult to detect.

JP 2008-232832 A discloses a technique in which when a noise floor of an FFT waveform is increased and it is determined that radio wave interference is present, an interference removal process is performed to reduce the noise floor. JP 2008-232832 A discloses, as the interference removal process, for example, removal and interpolation of a sampling value at a portion of a waveform (hereinafter referred to as a time waveform) before being subjected to frequency analysis in which a sudden change in signal level has occurred due to influence of the radio wave interference.

As a result of detailed study, however, the inventor has found the following problems of the conventional technique described in JP 2008-232832 A. Specifically, while the interference removal process is performed, an FFT process is performed for a time waveform subjected to the interference removal process. Accordingly, even when a noise floor of the FFT waveform is reduced to a normal value, it has been impossible to distinguish whether the reduction has been achieved by the interference prevention or by the end of the interference state, and this has made it impossible to accurately determine when to end the interference removal process. Furthermore, the interference removal process has a function as a low-pass filter, and thus if the interference removal process is performed in a situation where no radio wave interference is present, a peak based on a reflected wave from a target is also partially removed. This may cause deterioration in detection accuracy.

An aspect of the present disclosure is to provide a technique of accurately determining whether to continue or end an interference removal process.

Embodiments of the present disclosure will be described with reference to the drawings.

[1. Configuration]

Figure 1:
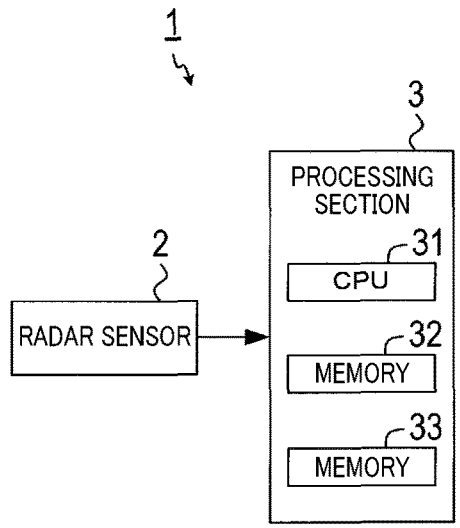
FIG. 1 is a block diagram showing a configuration of an in-vehicle radar system.

A radar system 1 shown in FIG. 1 includes a radar sensor 2 and a processing section 3.

The radar sensor 2 is an FMCW radar that, for each preset processing cycle, transmits and receives a frequency modulated continuous wave, and outputs a beat signal obtained by mixing the transmitted wave with the received wave.

FMCW is an abbreviation for a Frequency Modulated Continuous Wave. The radar sensor 2 is not limited to an FMCW radar. For example, the radar sensor 2 only needs to be a radar sensor, such as a multifrequency CW radar, which performs frequency analysis of a received signal or a beat signal to extract information on an object that has reflected a radar wave.

The processing section 3 includes a microcomputer having a CPU 31 and a semiconductor memory (hereinafter referred to as a memory 32) such as a RAM, a ROM, or a flash memory. The processing section 3 further includes an AD conversion section 33. The AD conversion section 33 samples a beat signal outputted from the radar sensor 2, and stores the beat signal in a predetermined area of the memory 32.

Various functions of the processing section 3 are performed when the CPU 31 executes programs stored in a non-transitory tangible storage medium. In this example, the memory 32 corresponds to the non-transitory tangible storage medium storing the programs. When the program is executed, a method corresponding to the program is performed. The processing section 3 may include a single microcomputer, or may include a plurality of microcomputers.

When the programs are executed by the CPU 31, the processing section 3 performs at least a target detection process and an interference prevention process. A method of performing these processes are not limited to using software. Some or all elements of the processes may be performed by using one or more types of hardware. For example, when the above functions are performed by an electronic circuit which is hardware, the electronic circuit may be implemented by a digital circuit, an analog circuit, or a combination thereof.

The interference prevention process is a process in which on the basis of sampling data of the beat signal stored in the memory 32, it is determined whether radio wave interference is present, and on the basis of the determination result, noise is removed from the beat signal. Details of the interference prevention process will be described later. The processing section 3 that performs the interference prevention process corresponds to an interference prevention apparatus.

The target detection process is a process in which by a well-known method using the FMCW radar, target information including a speed and a position of a target that has reflected a radar wave is generated on the basis of a signal waveform (hereinafter referred to as an FFT waveform) that has been subjected to frequency analysis and is obtained by the interference prevention process. The target detection process is not a main part of the present disclosure, and thus description of the target detection process will be omitted.

[2. Process]

[2-1. Interference Prevention Process]

Figure 2:
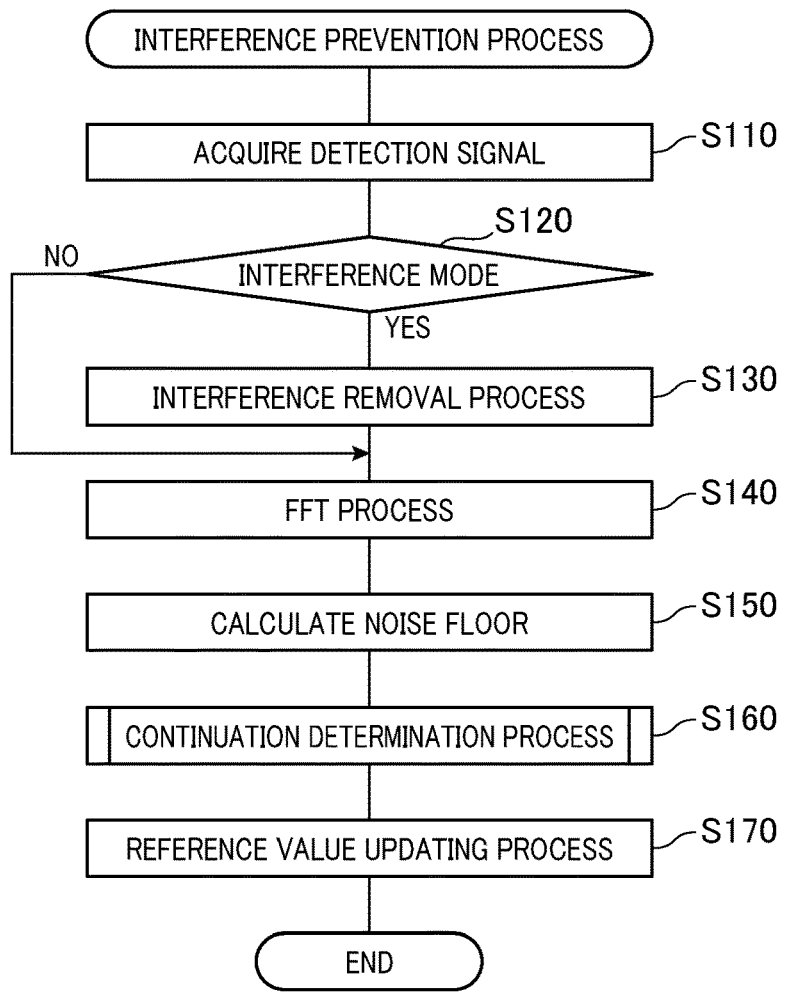
FIG. 2 is a flow chart of an interference prevention process.

Next, the interference prevention process performed by the processing section 3 will be described with reference to a flow chart in FIG. 2. The processing section 3 starts the present process for each processing cycle. Furthermore, the processing section 3 has two operation modes, i.e., a normal mode and an interference mode. In an initial state immediately after power is applied to the processing section 3, the operation mode is set to the normal mode. The memory 32 has at least a region for storing a reference value used to set an interference threshold described later.

When the present process is started, first in S110, the processing section 3 acquires sampling data (hereinafter referred to as non-prevention data) of a beat signal for one cycle of the FMCW stored in the memory 32.

In S120, the processing section 3 determines whether the operation mode is set to the interference mode. Specifically, with regard to a count value C of a continuation counter described later, when C=0, the processing section 3 determines that the operation mode is set to the normal mode, and when C>0, the processing section 3 determines that the operation mode is set to the interference mode. If the processing section 3 determines that the operation mode is set to the interference mode, the control proceeds to S130. If the processing section 3 determines that the operation mode is not set to the interference mode, the control proceeds to S140.

In S130, the processing section 3 performs an interference removal process. Specifically, by applying a median filter to the non-prevention data acquired in S110, the processing section 3 removes noise that has been caused by an influence of radio wave interference and superimposed on the beat signal. Through the application of the median filter, for example, when a region showing a great change exceeding a preset allowable range is present between temporally continuous data, a value of the region is replaced with an average value of the data sandwiching the region, or the like. Thus, the median filter functions as a low-pass filter. Hereinafter, data obtained as a result of performing the interference removal process with respect to the non-prevention data is referred to as prevention data.

In S140, the processing section 3 performs an FFT process with respect to time data. When the operation mode is the normal mode, the time data is the non-prevention data acquired in S110. When the operation mode is the interference mode, the time data is the prevention data generated in S130. Hereinafter, a waveform indicated by the time data is referred to as a time waveform, and a waveform obtained as a result of the FFT process is referred to as an FFT waveform.

In S150, the processing section 3 obtains a noise floor on the basis of the FFT waveform generated in S140. At this time, the noise floor is the lowest signal intensity of the FFT waveform. However, the noise floor is not limited to this. For example, a signal intensity obtained for each frequency bin may be used to create a histogram indicating frequencies of signal intensities, and the noise floor may be set to a signal intensity with the highest frequency in the histogram. Furthermore, the noise floor may be set to an average value of signal intensities in regions excluding a region around a peak of the FFT waveform.

In S160, the processing section 3 performs a continuation determination process regarding setting of the operation mode. Details of the continuation determination process will be described later.

Figure 4:
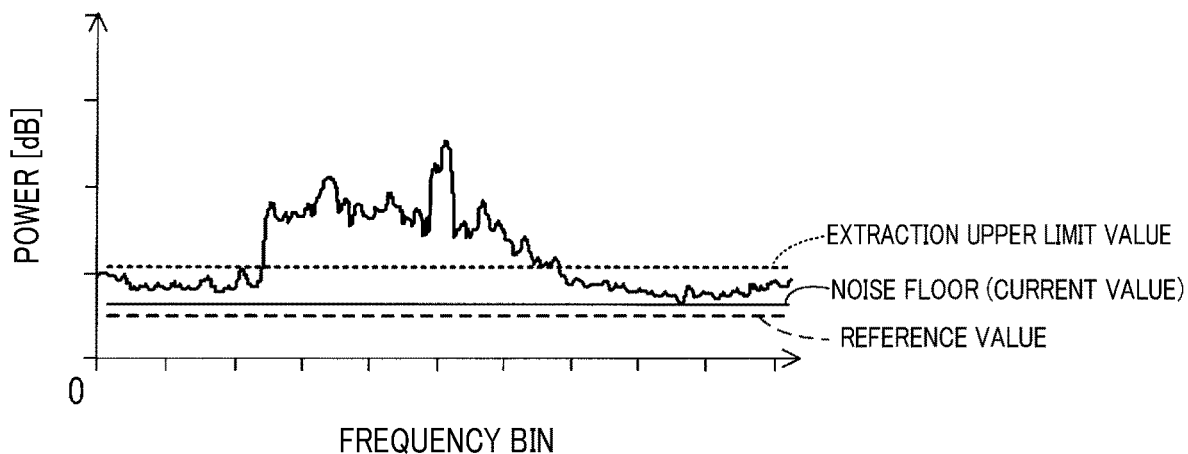
FIG. 4 is an explanatory view regarding setting of a reference value.

In S170, the processing section 3 performs a reference value updating process of obtaining a reference value that serves as a criterion for determination of whether radio wave interference is present. Then, the present process is ended. In the reference value updating process, as shown in FIG. 4, when the noise floor (hereinafter referred to as a current value) obtained at S150 is lower than the reference value stored in the memory 32, the processing section 3 updates the stored reference value with the current value. Thus, the reference value is set to the lowest value of the noise floors previously detected. An initial value of the reference value is set to a preset extraction upper limit value. For example, the extraction upper limit value is set to an upper limit value of the noise floor that can be detected when no radio wave interference is present.

[2-2. Continuation Determination Process]

Figure 3:
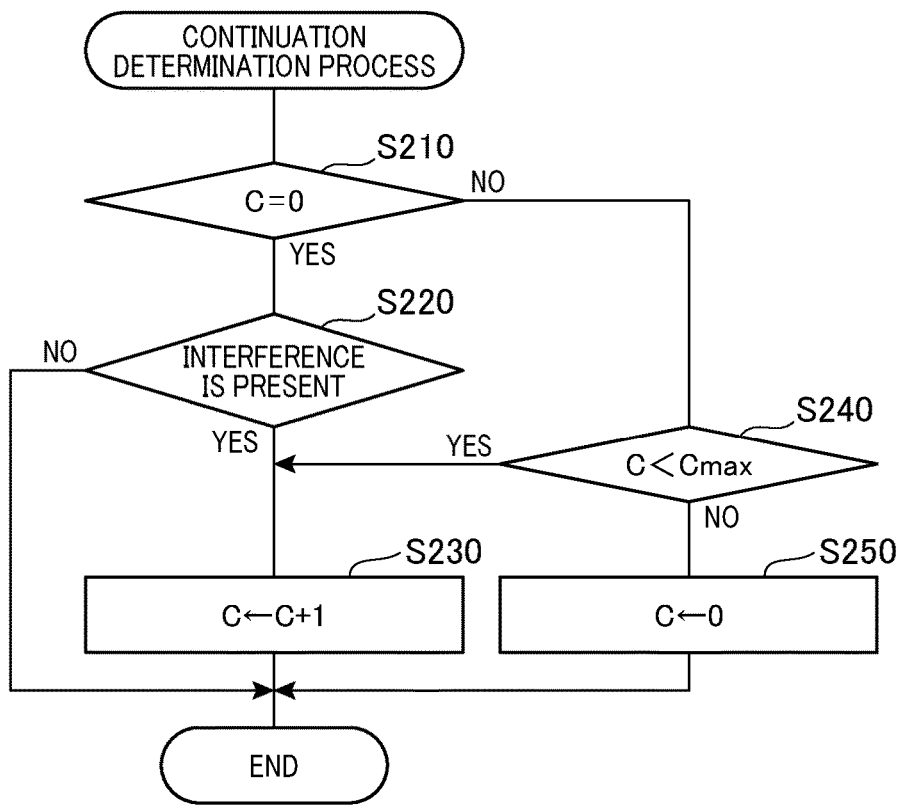
FIG. 3 is a flow chart of a continuation determination process.

Details of the continuation determination process performed by the processing section 3 in S160 mentioned earlier will be described with reference to a flow chart in FIG. 3. The memory 32 has a region for storing the count value C of the continuation counter. When the processing section 3 is initialized, the count value C is set so that C=0.

When the present process is started, in S210, the processing section 3 determines whether the count value C of the continuation counter is set so that C=0. If the processing section 3 determines that C=0, i.e., the operation mode is the normal mode, the control proceeds to S220. If the processing section 3 determines that C≠0, i.e., the operation mode is the interference mode, the control proceeds to S240.

In S220, the processing section 3 determines whether radio wave interference has occurred. Specifically, the processing section 3 determines whether the noise floor calculated in S150 is more than an interference threshold obtained by adding a preset allowable value to the reference value updated as needed in S170. The allowable value is set so that at least the interference threshold is more than the extraction upper limit value used to update the reference value. If the noise floor is more than the interference threshold, the processing section 3 determines that the radio wave interference has occurred, and the control proceeds to S230. If the noise floor is the interference threshold or less, the processing section 3 determines that no radio wave interference has occurred, and the present process is ended.

In S230, the processing section 3 increments the count value C of the continuation counter, and the present process is ended.

In S240, the processing section 3 determines whether the count value C of the continuation counter is less than a preset continuation number Cmax. If C<Cmax, the processing section 3 determines that the interference mode needs to be maintained, and the control proceeds to S230. If C≥Cmax, the processing section 3 determines that the operation mode needs to be switched from the interference mode to the normal mode, and the control proceeds to S250.

In S250, by setting the count value C of the continuation counter so that C=0, the processing section 3 switches the operation mode to the normal mode, and the continuation determination process is ended.

[3. Operation]

Figure 5:
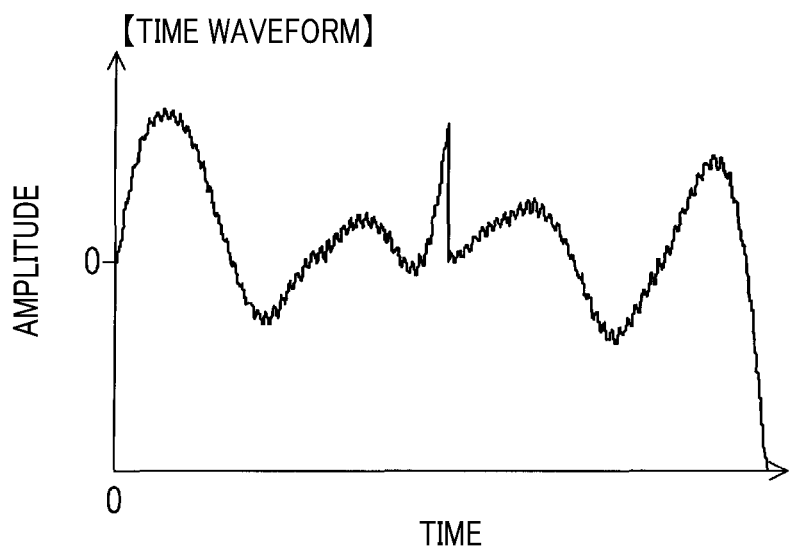
FIG. 5 is an explanatory view illustrating a time waveform and an FFT waveform when no interference is present.
Figure 5:
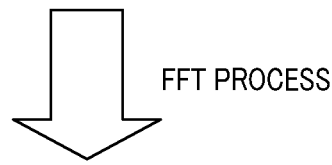
Figure 5:
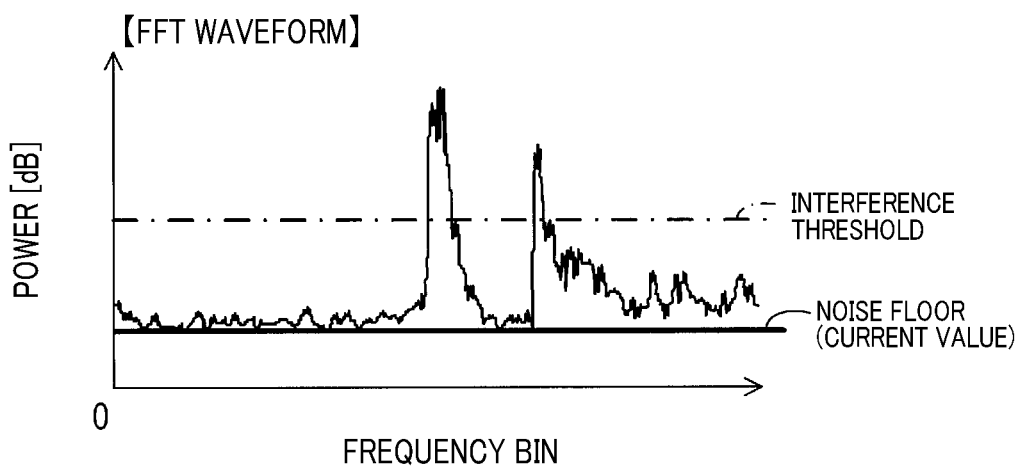
Figure 6:
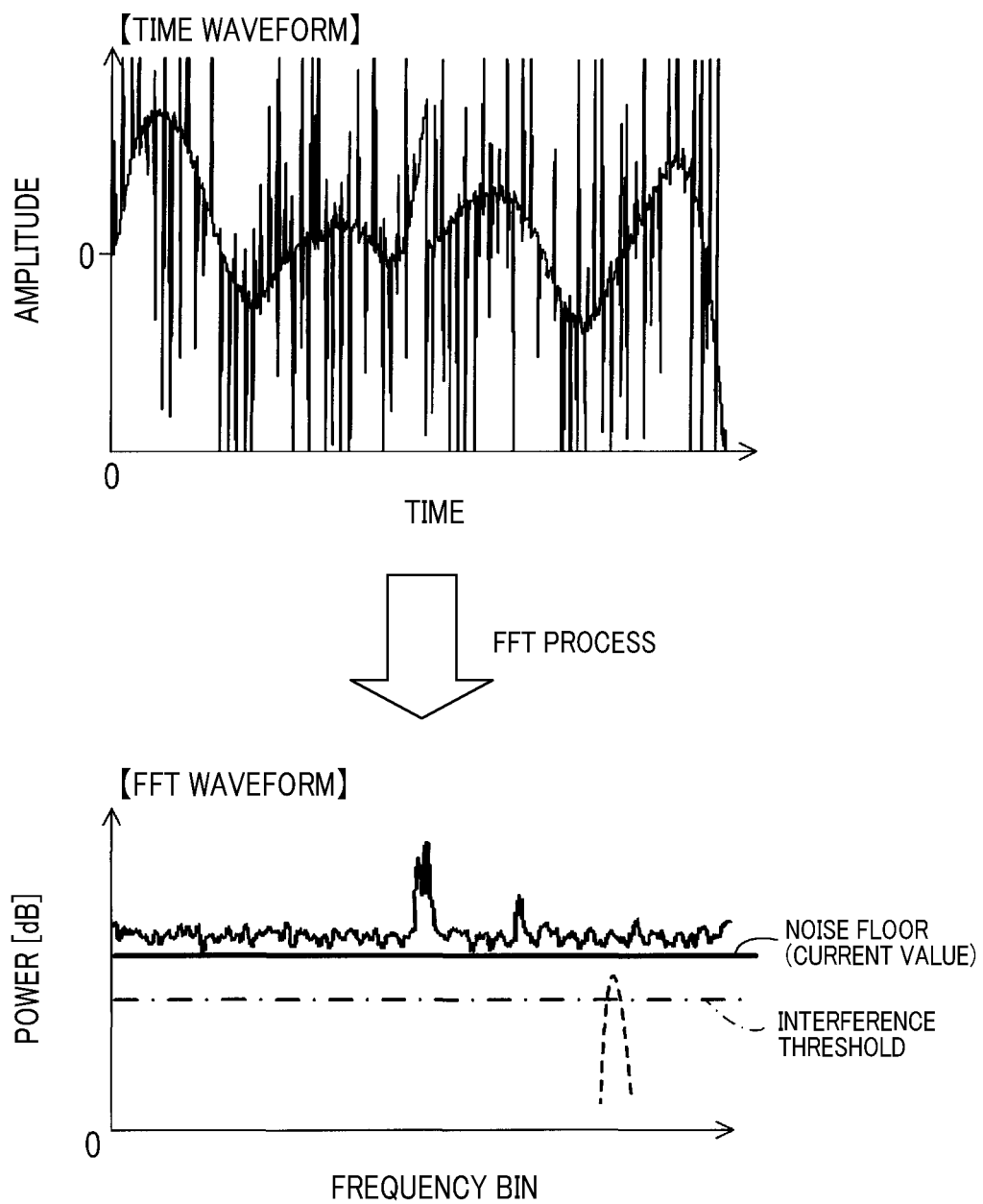
FIG. 6 is an explanatory view illustrating a time waveform and an FFT waveform when interference is present.

When no radio wave interference is present, as shown in FIG. 5, no spike noise is superimposed on the time waveform, and a noise floor of the FFT waveform is lower than the interference threshold. On the other hand, when radio wave interference is present, as shown in FIG. 6, much spike noise is superimposed on the time waveform, and a noise floor of the FFT waveform is greatly increased. This may lead to, as shown by a dashed line in FIG. 6, a situation where a peak based on a reflected wave from a target is buried in the noise floor and the peak cannot be detected. In order to prevent such a situation, the interference removal process is performed.

Figure 7:
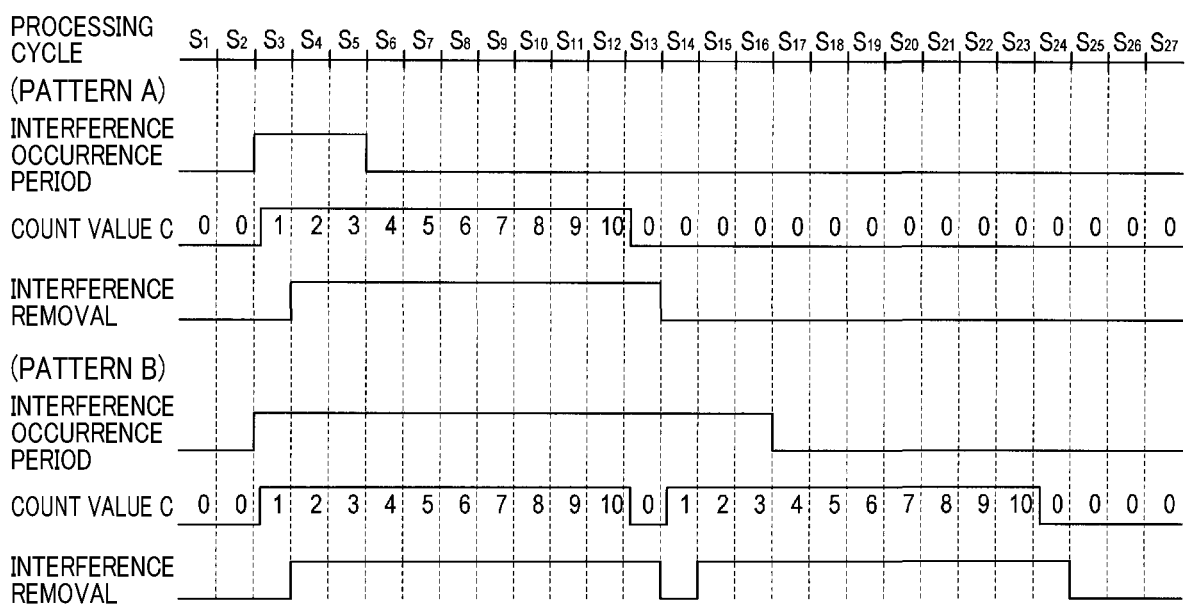
FIG. 7 is an explanatory view showing an operation example of the interference prevention process.

A relationship between a processing cycle, an interference occurrence period, a count value C, and an implementation status of the interference removal process will be described below with reference to FIG. 7, assuming that Cmax=10.

First, pattern A will be described in which the interference occurrence period is processing cycles S3 to S5 and is shorter than a time period corresponding to 10 processing cycles, which is a duration of interference prevention.

In processing cycles S1 and S2 in which no interference is detected, the count value C of the continuation counter is maintained so that C=0. Thus, the operation mode is the normal mode, and the interference removal process is not performed.

At the start of processing cycle S3, C=0, i.e., the operation mode is the normal mode. Accordingly, the FFT process is performed by using non-prevention data not subjected to the interference removal process, and on the basis of an FFT waveform obtained as a result of the process, it is determined whether radio wave interference is present. At this time, it is determined that the radio wave interference is present, and thus the count value C is incremented so that C=1.

At the start of processing cycle S4, C=1, i.e., the operation mode is the interference mode. Accordingly, the FFT process is performed by using prevention data subjected to the interference removal process. Thus, on the basis of an FFT waveform obtained as a result of the process, it cannot be determined whether radio wave interference is present. Furthermore, the count value C of the continuation counter is incremented so that C=2.

Until processing cycle S12, at the start of which C<Cmax, a process similar to that in processing cycle S4 is repeated. Thus, the interference removal process is continuously performed.

At the start of processing cycle S13, C>0, i.e., the operation mode is the interference mode. Accordingly, the FFT process is performed by using prevention data subjected to the interference removal process. However, C=Cmax, and thus the count value C of the continuation counter is reset so that C=0.

At the start of processing cycle S14, C=0, i.e., the operation mode is the normal mode. Accordingly, the FFT process is performed by using non-prevention data not subjected to the interference removal process, and on the basis of an FFT waveform obtained as a result of the process, it is determined whether radio wave interference is present. At this time, it is determined that no radio wave interference is present, and thus the count value C is maintained so that C=0. After processing cycle S15, a process similar to the process in processing cycle S14 is performed.

Thus, in pattern A, when radio wave interference is detected, the operation mode is switched to the interference mode, and for a certain time period from a next processing cycle, the interference removal process is continued, and then the operation mode returns to the normal mode.

Next, pattern B will be described in which the interference occurrence period is processing cycles S3 to S16 and is longer than a time period corresponding to 10 processing cycles, which is a duration of interference prevention.

Processing cycles S1 to S13 are similar to those of pattern A.

At the start of processing cycle S14, C=0, i.e., the operation mode is the normal mode. Accordingly, the FFT process is performed by using non-prevention data not subjected to the interference removal process, and on the basis of an FFT waveform obtained as a result of the process, it is determined whether radio wave interference is present. At this time, it is determined that the radio wave interference is present, and thus the count value C is incremented so that C=1.

Processes in processing cycle S14 to S24 are similar to those in processing cycle S3 to S13.

Thus, in pattern B, an operation similar to that in pattern A is performed. However, in processing cycle S14 in which the operation mode returns to the normal mode, radio wave interference is immediately detected, and thus the operation mode is switched again to the interference mode. Thus, when the interference mode is maintained for 10 cycles, the interference removal process is temporarily interrupted, and it is determined in the normal mode whether radio wave interference is present. Then, when it is determined that the radio wave interference is present, the operation mode returns to the interference mode, and from the next processing cycle, the interference removal process is immediately resumed. A similar process is repeated until it is determined that no radio wave interference is present in the determination of whether radio wave interference is present, which is performed by periodically interrupting the interference removal process.

[4. Effects]

The present embodiment described above in detail provides the following effects.

(4a) According to the radar system 1, in a case where radio wave interference is continuously present for a long time, the interference removal process is periodically interrupted, and by using a non-prevention signal, it is determined whether the radio wave interference is present. Then, when the radio wave interference is continuously present, the interference removal process is immediately resumed. This makes it possible to accurately determine whether to continue or end the interference removal process.

(4b) According to the radar system 1, by using a non-prevention signal not subjected to the interference removal process, it is determined whether radio wave interference is present, and when it is determined that the radio wave interference is present, the interference removal process is performed from the next processing cycle. Accordingly, when it is determined that the radio wave interference is present, the frequency analysis process does not need to be performed again. This can reduce the amount of processing in a single processing cycle.

[5. Other Embodiments]

An embodiment of the present disclosure has been described. However, the present disclosure is not limited to the embodiment described above, and may be variously modified.

(5a) The above embodiment shows as an example of a case where Cmax=10, but the present disclosure is not limited to this. The value of Cmax may be set as appropriate according to use environment of the radar system 1, a length of the processing cycle, or the like.

(5b) In the above embodiment, as the interference removal process, a median filter is applied to the non-prevention signal, but the present disclosure is not limited to this. The interference removal process only needs to be able to remove a spike from the non-prevention signal. Instead of the median filter, for example, a process may be performed in which when a differential value of a portion of a signal waveform exceeds a threshold, the portion of the waveform is complemented.

(5c) In the above embodiment, a plurality of functions of a single component may be implemented by a plurality of components, or a single function of a single component may be implemented by a plurality of components. Furthermore, a plurality of functions of a plurality of components may be implemented by a single component, or a single function implemented by a plurality of components may be implemented by a single component. Furthermore, a part of the configuration of the embodiment may be omitted. Furthermore, at least a part of the configuration of the embodiment may be added to or substituted by another part of the configuration of the above embodiment. Any aspect included in a technical idea specified by the wording of the claims is an embodiment of the present disclosure.

(5d) In addition to the interference prevention apparatus described above, i.e., the processing section 3 that performs the interference prevention process, the present disclosure may also be implemented in various forms such as a system including the interference prevention apparatus as a component, a program for allowing a computer to function as the prevention interference apparatus, a non-transitory tangible storage medium, such as a semiconductor memory, in which the program is stored, and an interference prevention method.

Hereinafter, aspects of the above-described embodiment will be summarized.

The interference prevention apparatus (1) according to the embodiment of the present disclosure includes an acquisition section (S110), a prevention section (S130), an analysis section (S120, S140), a determination section (S220), and a switching section (S210, S230 to S250).

The acquisition section acquires a signal from a radar sensor for each processing cycle which is a preset cycle. The prevention section generates a prevention signal by performing an interference removal process with respect to a non-prevention signal which is the signal acquired by the acquisition section. The interference removal process is a process of preventing an influence of radio wave interference. The analysis section performs a frequency analysis process by using the prevention signal when a set operation mode is an interference mode and by using the non-prevention signal when the operation mode is a normal mode. The determination section determines, based on an analysis result obtained by the analysis section, whether radio wave interference is present. When the operation mode is the normal mode and the determination section determines that the interference is present, the switching section switches the operation mode to the interference mode, maintains a state in which the operation mode is the interference mode during a preset number of processing cycles, and then switches the operation mode to the normal mode.

With such a configuration, when radio wave interference is detected while the operation mode is the normal mode, the operation mode is switched from the normal mode to the interference mode, and thus during a certain number of processing cycles from the next processing cycle, the interference removal process is continuously performed. Then, the operation mode is switched from the interference mode to the normal mode, and in the next processing cycle, by using a non-prevention signal not subjected to the interference removal process, it is determined whether radio wave interference is present.

Thus, in a case where radio wave interference is continuously present for a long time, the interference removal process is periodically interrupted, and by using a non-prevention signal, it is determined whether the radio wave interference is present. Then, when the radio wave interference is continuously present, the interference removal process is immediately resumed. This makes it possible to accurately determine whether to continue or end the interference removal process.

According to the interference prevention apparatus, by using a non-prevention signal not subjected to the interference removal process, it is determined whether radio wave interference is present, and when it is determined that the radio wave interference is present, the interference removal process is performed from the next processing cycle. Accordingly, when it is determined that the radio wave interference is present, the frequency analysis process does not need to be performed again. This can reduce the amount of processing in a single processing cycle.

Note that reference signs in parentheses described in the claims indicate a correspondence relationship with specific means described in the embodiment described above as an aspect, and do not limit a technical scope of the present disclosure.

What is claimed is:

1. A system comprising:
a processor configured to:
  acquire a sensor signal from a radar sensor for each of a plurality of processing cycles, each of the plurality of processing cycles being a preset cycle for acquiring a sensor signal;
  generate a prevention signal by performing an interference removal process with respect to the sensor signal, the interference removal process including filtering the sensor signal to remove noise from the sensor signal;
  perform a frequency analysis process to generate an analysis result, the frequency analysis process:
    using the prevention signal when an operation mode is an interference mode to generate the analysis result, and
    using the sensor signal when the operation mode is a normal mode to generate the analysis result;
  determine, based on the analysis result generated using the sensor signal, whether radio wave interference is present; and
  in response to the operation mode being the normal mode and determining that the radio wave interference is present:
    switch the operation mode to the interference mode,
    maintain a state in which the operation mode is the interference mode during a preset number of the plurality of processing cycles, and
    after the preset number of the plurality of processing cycles, switch the operation mode to the normal mode.

2. The system according to claim 1, wherein the filtering the sensor signal includes applying a median filter to the sensor signal.

3. The system according to claim 1, wherein the determination of whether radio wave interference is present is based on a level of a noise floor.

4. The system according to claim 1, wherein the radar sensor is an FMCW radar or a multifrequency CW radar, and the sensor signal acquired from the radar sensor is a beat signal.

5. The system according to claim 1, wherein the processor is further configured to detect a target:
  based on the prevention signal when the operation mode is the interference mode, and
  based on the sensor signal when the operation mode is the normal mode.

* * * * *